US012228438B2

(12) United States Patent
Schwenter

(10) Patent No.: US 12,228,438 B2
(45) Date of Patent: Feb. 18, 2025

(54) MEASUREMENT SENSOR OF A CORIOLIS FLOW METER, AND CORIOLIS FLOW METER

(71) Applicant: Endress+Hauser Flowtec AG, Reinach (CH)

(72) Inventor: Benjamin Schwenter, Ettingen (CH)

(73) Assignee: Endress+Hauser Flowtec AG, Reinach (CH)

( * ) Notice: Subject to any disclaimer, the term of this patent is extended or adjusted under 35 U.S.C. 154(b) by 242 days.

(21) Appl. No.: 18/000,162

(22) PCT Filed: Apr. 23, 2021

(86) PCT No.: PCT/EP2021/060733
§ 371 (c)(1),
(2) Date: Nov. 29, 2022

(87) PCT Pub. No.: WO2021/239351
PCT Pub. Date: Dec. 2, 2021

(65) Prior Publication Data
US 2023/0204397 A1 Jun. 29, 2023

(30) Foreign Application Priority Data
May 29, 2020 (DE) ...................... 10 2020 114 518.7

(51) Int. Cl.
*G01F 1/84* (2006.01)
*G01F 15/18* (2006.01)
(52) U.S. Cl.
CPC .......... *G01F 1/8413* (2013.01); *G01F 1/8422* (2013.01); *G01F 1/8477* (2013.01); *G01F 15/185* (2013.01)

(58) Field of Classification Search
CPC .... G01F 1/8413; G01F 1/8422; G01F 1/8477; G01F 15/185
See application file for complete search history.

(56) References Cited

U.S. PATENT DOCUMENTS 4,891,991 A   1/1990 Mattar et al.
5,157,975 A   10/1992 Tanaka et al.
(Continued)

FOREIGN PATENT DOCUMENTS

DE   4026724 A1   3/1992
DE   3853212 T2   9/1995
(Continued)

*Primary Examiner* — Jonathan M Dunlap
(74) *Attorney, Agent, or Firm* — Christopher R. Powers; Endress+Hauser (USA) Holding, Inc.

(57) ABSTRACT

The present disclosure relates to a measuring transducer of a Coriolis flow meter including a measuring tube arrangement having at least one measuring tube having an inlet section and an outlet section. The measuring transducer also includes at least a first exciter component of an oscillation exciter and at least a first sensor component of an oscillation sensor. A securement body arrangement is connected with the at least one measuring tube in the inlet section and/or in the outlet section, with the securement body arrangement having at least one opening. A connecting component connecting the measuring tube arrangement with a process line, wherein the connecting component includes at least one fastener apparatus, which extends through the opening of the securement body arrangement, wherein the connecting component is connected with the securement body arrangement via the fastener apparatus at least by shape interlocking.

14 Claims, 3 Drawing Sheets

(56) References Cited

U.S. PATENT DOCUMENTS

| | | | | |
|---|---|---|---|---|
| 5,184,107 | A * | 2/1993 | Maurer | G01L 19/147 |
| | | | | D13/101 |
| 5,410,916 | A * | 5/1995 | Cook | G01L 19/0023 |
| | | | | 73/431 |
| 7,426,869 | B2 * | 9/2008 | Fujimoto | G01L 19/0007 |
| | | | | 73/756 |
| 11,585,687 | B2 * | 2/2023 | Malani | G01D 11/30 |
| 2005/0103122 | A1 | 5/2005 | Dille | |
| 2007/0234822 | A1 | 10/2007 | Bitto et al. | |
| 2008/0127741 | A1 * | 6/2008 | Selvan | G01F 1/383 |
| | | | | 702/138 |
| 2018/0045546 | A1 | 2/2018 | Nielson et al. | |
| 2020/0319006 | A1 * | 10/2020 | Malani | G01F 1/8409 |

FOREIGN PATENT DOCUMENTS

| | | |
|---|---|---|
| DE | 102009032247 A1 | 6/2010 |
| DE | 102018119887 A1 | 2/2020 |
| WO | 2019017891 A1 | 1/2019 |

* cited by examiner

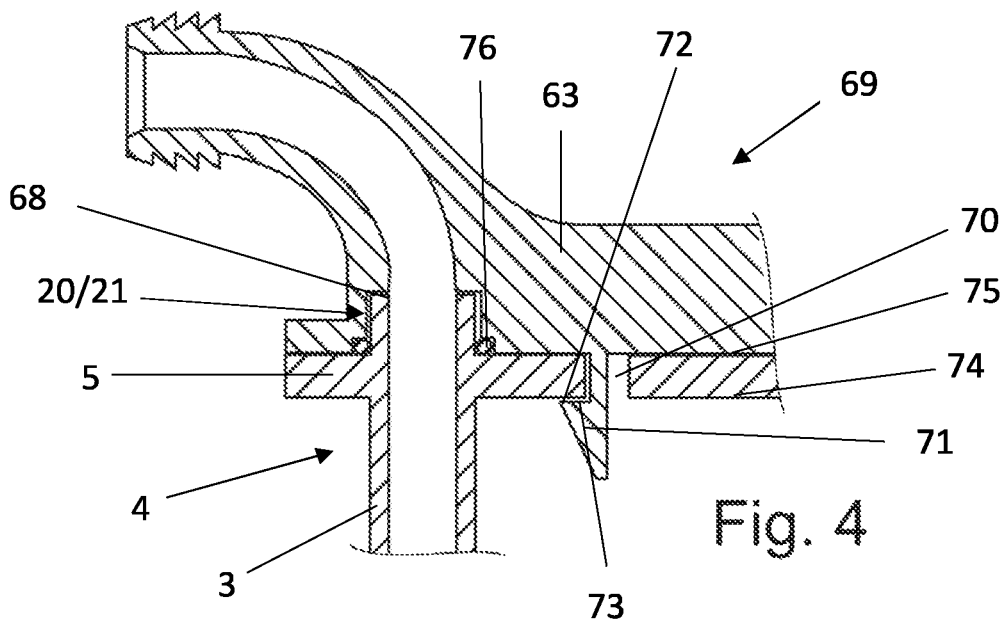
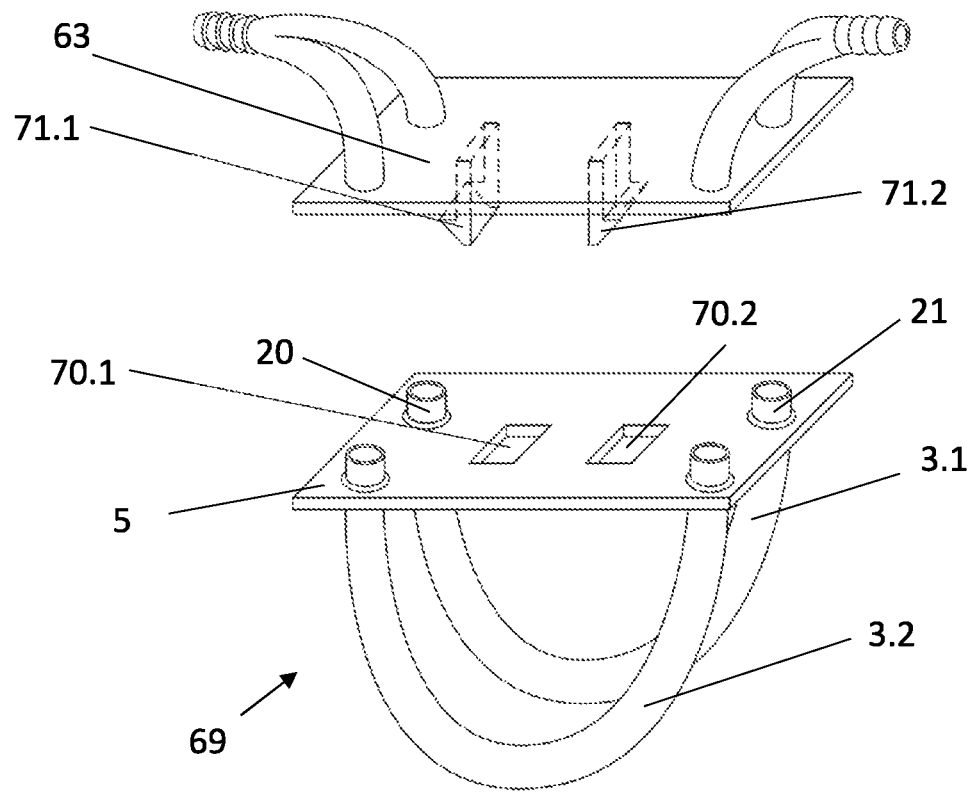
Fig. 5

MEASUREMENT SENSOR OF A CORIOLIS FLOW METER, AND CORIOLIS FLOW METER

CROSS-REFERENCE TO RELATED APPLICATIONS

The present application is related to and claims the priority benefit of DPMA Patent Application No. 10 2020 114 518.7, filed on May 29, 2020 and International Patent Application No. PCT/EP2021/060733, filed on Apr. 23, 2021, the entire contents of which are incorporated herein by reference.

TECHNICAL FIELD

The invention relates to a measuring transducer of a measuring device for registering mass flow, viscosity, density, and/or a variable derived therefrom, for a flowable medium and to a measuring device for registering mass flow, viscosity, density, and/or a variable derived therefrom, for a flowable medium, especially a Coriolis flow meter for preferably biopharmaceutical applications.

BACKGROUND

Field devices of process measurements technology with measuring transducers of vibration-type and, especially, Coriolis flow meters, have been known for many years. The basic construction of such a flow meter is described, for example, in EP 1 807 681 A1, wherein comprehensive reference is taken to this publication for the construction of a field device of the field of the invention in the context of the present invention.

Typically, Coriolis flow meters have at least one or more oscillatable measuring tubes, which can be caused to execute oscillations by means of an oscillation exciter. These oscillations propagate over the tube length and are influenced by the type of flowable medium located in the measuring tube and by its flow velocity. An oscillation sensor or especially two oscillation sensors mutually spaced in the flow direction can register the oscillations in the form of a measurement signal or more than one measurement signal, as the case may be. From the one or more measurement signals, an evaluation unit can then ascertain for the flowable medium its mass flow, viscosity, density and/or some other variable derived therefrom.

There are Coriolis flow meters with replaceable, single use measuring tube arrangements. Thus, for example, WO 2011/099989 A1 teaches a method for producing a monolithically formed measuring tube arrangement of a Coriolis flow meter with bent measuring tubes, wherein the measuring tube bodies of the measuring tubes are first formed solidly of a polymer and the passageways for conveying the flowable medium are then machined in with a cutting tool. WO 2011/099989 A1 teaches—same as U.S. Pat. No. 10,209,113 B2—a connecting body, which is adapted to receive and support the replaceable measuring tube arrangement. The two documents do not disclose, however, how the single use measuring tube arrangement can be connected to a hose—and/or plastic tube system.

SUMMARY

Starting from the above described state of the art, an object of the invention is to provide a solution for connecting the measuring transducer to a hose—and/or plastic tube system.

Furthermore, an object of the invention is to provide a measuring device having a corresponding measuring transducer.

The objects are achieved by the measuring transducer and the measuring device as defined in the present disclosure. Advantageous embodiments of the invention are set forth in the dependent claims.

The measuring transducer of the invention for a measuring device for registering mass flow, viscosity, density, and/or a variable derived therefrom, for a flowable medium comprises:
- a measuring tube arrangement for conveying the flowable medium,
  - wherein the measuring tube arrangement has at least one measuring tube,
  - wherein the at least one measuring tube has an inlet section and an outlet section;
- at least a first exciter component of an oscillation exciter for exciting the at least one measuring tube to execute oscillations,
  - wherein the first exciter component is arranged at the at least one measuring tube;
- at least a first sensor component of an oscillation sensor for registering oscillations of the at least one measuring tube,
  - wherein the first sensor component is arranged at the at least one measuring tube;
- a securement body arrangement,
  - wherein the securement body arrangement is connected with the at least one measuring tube in the inlet section and/or in the outlet section,
  - wherein the securement body arrangement has at least one opening; and
- a connecting means for releasable connecting of the measuring tube arrangement with a process line,
  - wherein the connecting means includes pipe connection openings, to which the measuring tube arrangement is connected,
  - wherein the connecting means is connected with the at least one measuring tube in the inlet section and/or in the outlet section,
  - wherein the connecting means includes at least one fastener apparatus, which extends through the opening of the securement body arrangement,
  - wherein the connecting means is connected with the securement body arrangement via the fastener apparatus at least by shape interlocking.

According to the invention, the connecting means serves as an adapter for connecting the measuring tube arrangement to a hose—and/or plastic tube system with variable nominal diameters. Thus, the measuring tube arrangement can be produced independently of the hose—and/or plastic tube system and, when required, be connected with the hose—and/or plastic tube system via corresponding process connections via a connecting means provided for the hose—and/or plastic tube system.

The connecting means can be formed of a material comprising steel, plastic, ceramic and/or glass.

The measuring tubes comprise, in each case, a measuring tube body, which is formed of a material comprising metal, especially steel, plastic, glass and/or ceramic. The measuring tubes are bent at least once. Preferably, a basic form of the measuring tube body is a U-shape. However, also other forms having at least one bend are known and fall within the scope of the invention.

The at least one oscillation exciter includes usually at least one exciter magnet and at least one exciter coil for producing a time variable magnetic field. The exciter magnet is arranged on the measuring tube to be excited to execute oscillations. The exciter coil can be arranged on an additional measuring tube or on a support means, into which the measuring tube, or the measuring transducer, is inserted and which serves to shield the measuring transducer from disturbances and/or to receive the electronic components of the measuring device, such as a measuring-, operating- and/or evaluation circuit. The measuring tube arrangement can, additionally, have a unique identification, for example, in the form of a QR code and/or an RFID tag. The identification can include information concerning the zero point and/or the calibration factor, with whose help the evaluation circuit can ascertain a corrected measured variable.

The at least one oscillation sensor includes, as a rule, at least one sensor magnet and a sensor coil for registering a time variable magnetic field. The sensor magnet is arranged on an oscillatable measuring tube. The sensor coil can be arranged on an additional oscillatable measuring tube or on the support means of the measuring device.

By the shape interlocking between connecting means and securement body arrangement, a connecting of the two components is possible without any helping tool. The connection between the securement body arrangement and the connecting means can be so embodied that a releasing of the connection is only possible by breaking or cutting the fastener apparatus from the connecting means. Additionally, the opening and the fastener apparatus can be embodied in such a manner that a defective associating of the fastener apparatus and the measuring tube arrangement is prevented.

An embodiment provides that the securement body arrangement has a first side and a second side,
wherein the first side and the second side face away from one another,
wherein the opening extends from the first side to the second side,
wherein the connecting means has a connecting means contact area,
wherein the securement body arrangement has a securement body arrangement contact area on the first side,
wherein the connecting means contact area and the securement body arrangement contact area contact one another,
wherein the connecting means effects a force on the securement body arrangement via the fastener apparatus with a force component in the direction of the second side.

The force component acting supplementally to the shape interlocking connection in the direction of the second side acts against release of the connection.

The fastener apparatus is embodied in such a manner when going through the opening it elastically deforms, to a point, and then snaps into place, in order, thus, to form the shape interlocking connection.

An embodiment provides that the fastener apparatus comprises a detent.

An embodiment provides that a seal, especially an elastic seal, is arranged between connecting means and the second side of the securement body arrangement,
wherein the seal is clamped between connecting means and securement body arrangement and the clamping is retained via the shape interlocking.

As the connecting means is brought together with the securement body arrangement, the seal is deformed. The seal, however, due to its elastic properties, wants to return to its original form. This effects a force between fastener apparatus and securement body arrangement in the direction of the second side.

An embodiment provides that the connecting means has two fastener apparatuses,
wherein the securement body arrangement has two openings,
wherein each of the two fastener apparatuses extends through a different one of the two openings,
wherein the connecting means via the two fastener apparatuses effects forces on the securement body arrangement, each with a force component in the direction of the second side.

An embodiment provides that the measuring tube arrangement has two measuring tubes, especially measuring tubes extending parallel to one another,
wherein the two measuring tubes have, in each case, in the inlet section an inlet having an inlet direction and in the outlet section an outlet having an outlet direction,
wherein the at least two measuring tubes are bent between inlet section and outlet section at least once, especially exactly once,
wherein the inlet direction and the outlet direction are oppositely directed,
wherein the securement body arrangement is connected with the inlet section and the outlet section of each measuring tube.

An embodiment provides that the connecting means includes an inlet passageway,
wherein the inlet passageway is embodied to connect at least one inlet and preferably all the inlets of the measuring tubes with the process line,
wherein the connecting means includes an outlet passageway,
wherein the outlet passageway is embodied to connect at least one outlet section and preferably all the outlet sections of the measuring tubes with the process line.

In this embodiment, the connecting means serves as a distributor piece, i.e. it divides one passageway into two separate passageways. Because connecting means and measuring tube arrangement are two separate components, the geometry and shape of the measuring tubes can be embodied, or optimized, independently of the shape and geometry of the connecting means.

An embodiment provides that the connecting means includes a connecting passageway, which connects the inlet section of a first measuring tube with the outlet section of a second measuring tube.

The medium to be conveyed flows through the inlet passageway of the connecting means into the inlet of the first measuring tube. From there, it flows through the measuring tube lumen of the first measuring tube until it reaches the outlet and is conveyed via the connecting passageway to the inlet of a second measuring tube, where it flows through the measuring tube lumen to the outlet. From the outlet of the second measuring tube, it is then conveyed via the outlet passageway of the connecting means into the connected pipeline, or into the connected hose system, as the case may be.

Advantageous in the embodiment is that the measuring range shifts compared with measuring transducers, in the case of which the flowing medium is separated in the connecting means. Thus, a greater measuring range can be covered by identical measuring tube arrangements with different connection apparatuses. This not only simplifies the production of measuring transducers but also reduces the production costs.

Advantageous in the embodiment is that no renewed ascertaining of the calibration factor and the zero point is necessary for measuring tube arrangement in connection with the connecting means.

The connecting passageway is embodied to convey the medium and, thus, also contacts the medium. The connecting passageway preferably includes at least one bend. The connecting means is preferably monolithically embodied. Such a form cannot be released from a mold, and, consequently, is not implementable by means of a conventional production method, in which a piece is produced from an originally formless material, such as, for example, in the case of injection molding.

Such a connecting means can alternatively be implemented by means of an additive or cutting-tool production method. The connecting passageway can be drilled in a solid connecting means and then partially sealed with blind plugs.

An embodiment provides that the connecting means includes a connecting passageway, which connects the inlet of one of the at least two measuring tubes with the outlet belonging to the measuring tube.

An embodiment provides that the connecting means includes a first opening, which is complementary to the inlet of one of the at least two measuring tubes, wherein the connecting means includes a second opening, which is complementary to the outlet section of one of the at least two measuring tubes, wherein the inlet section and the outlet section of one of the at least two measuring tubes are arranged in their complementary openings.

The above two embodiments describe two options for isolating one of the two measuring tubes of the measuring tube arrangement from the flow, such that the medium is conveyed exclusively by one of the two measuring tubes. The first opening and the second opening are embodied as blind holes. Thus, a measuring tube arrangement having two measuring tubes can be applied in a single tube Coriolis flow meter.

An embodiment provides that the connecting means has a connecting means body, wherein the connecting means body comprises a plastic and preferably a polyether ether ketone, polyaryletherketone, polyphenylsulfone, polyethersulfone, polysulfone, polyarylamide, polypropylene, polycarbonate, polyethylene, fluoropolymer and/or hard polyethylene, wherein the measuring tube arrangement has a measuring tube arrangement body, wherein the measuring tube arrangement body comprises steel.

There exists a demand for measuring devices with single use measuring tubes, or single use measuring tube arrangements, for biopharmaceutical applications. For such purpose, the materials, which come in contact with the medium, must be biocompatible and gamma sterilizable. It is, consequently, especially advantageous that the measuring tube be produced from one of the above mentioned materials, since these fulfill the biopharmaceutical requirements. The mentioned plastics are suited additionally as feed material in an injection molding method for producing the connecting means.

Advantageously, the material of the measuring tube arrangement body differs from the material of the connecting means body. Thus, the total weight of the measuring transducer can be reduced. The measuring tubes can preferably be formed of steel and the connecting means of plastic.

An embodiment provides that the measuring tube arrangement comprises exactly two measuring tubes.

An embodiment provides that the connecting means has a temperature sensor, preferably one arranged on the connecting passageway.

An advantage of this embodiment is that a temperature measurement is possible in a region of the measuring tube arrangement which is mechanically decoupled from the oscillating measuring tubes. Thus, the connection between temperature sensor and connecting means is also loaded less. Furthermore, more exact temperature measurements are possible.

The temperature sensor comprises a resistance thermometer, thermocouple, temperature sensor using a quartz oscillator and/or a semiconductor temperature sensor.

In an embodiment, the measuring tube arrangement is connected to a hose- and/or plastic tube system, preferably for flow measurement in the case of automated industrial or laboratory plants.

In an embodiment, the measuring transducer, comprising the measuring tube arrangement, the connecting means and components of the oscillation exciter and sensors, and the hose- and/or plastic tube system, is kept in a container, especially a sterilization bag or pouch, which is embodied to maintain a sterility of the measuring tube arrangement and the hose- and/or plastic tube systems until opening of the container, wherein the measuring tube system is sterilized by means of radiation sterilization, preferably gamma ray sterilization or electron beam sterilization, hot steam sterilization and/or gas sterilization.

In an embodiment, at least one process monitoring unit is connected to the hose- and/or plastic tube system, wherein the process monitoring unit comprises a pressure measuring transducer, temperature sensor, a weight measuring device, a pH sensor, a density sensor, a flow meter for ascertaining mass flow, volume flow and/or flow velocity, a flow switch, a fill level sensor, a conductivity sensor, a concentration sensor, an oxygen sensor and/or a turbidity sensor.

The measuring device of the invention for registering mass flow, viscosity, density, and/or a variable derived therefrom, of a flowable medium comprises:

a support means;

a measuring transducer according to at least one of the preceding versions;

at least a second exciter component of the oscillation exciter; and at least a second sensor component of the oscillation sensor;

wherein the support means has a support means body with a seat, wherein the measuring transducer is arranged in the seat and mechanically releasably connected with the support means body;

wherein the second exciter component is arranged on the support means body, wherein the second sensor component is arranged on the support means body, wherein the oscillation exciter comprises an operating circuit, which is connected with at least one exciter component, especially the second exciter component of the at least one oscillation exciter, wherein the oscillation sensor comprises a measuring circuit, which is electrically connected at least with one sensor component, especially the second sensor component of the at least one oscillation sensor.

BRIEF DESCRIPTION OF THE DRAWINGS

The invention will now be explained in greater detail based on the appended drawing, the figures of which show as follows:

FIG. 4 shows a subsection of a longitudinal section of the measuring transducer of the present disclosure; and FIG. 5 shows an exploded view of an embodiment of the measuring transducer of the present disclosure.

DETAILED DESCRIPTION

Figure 1:
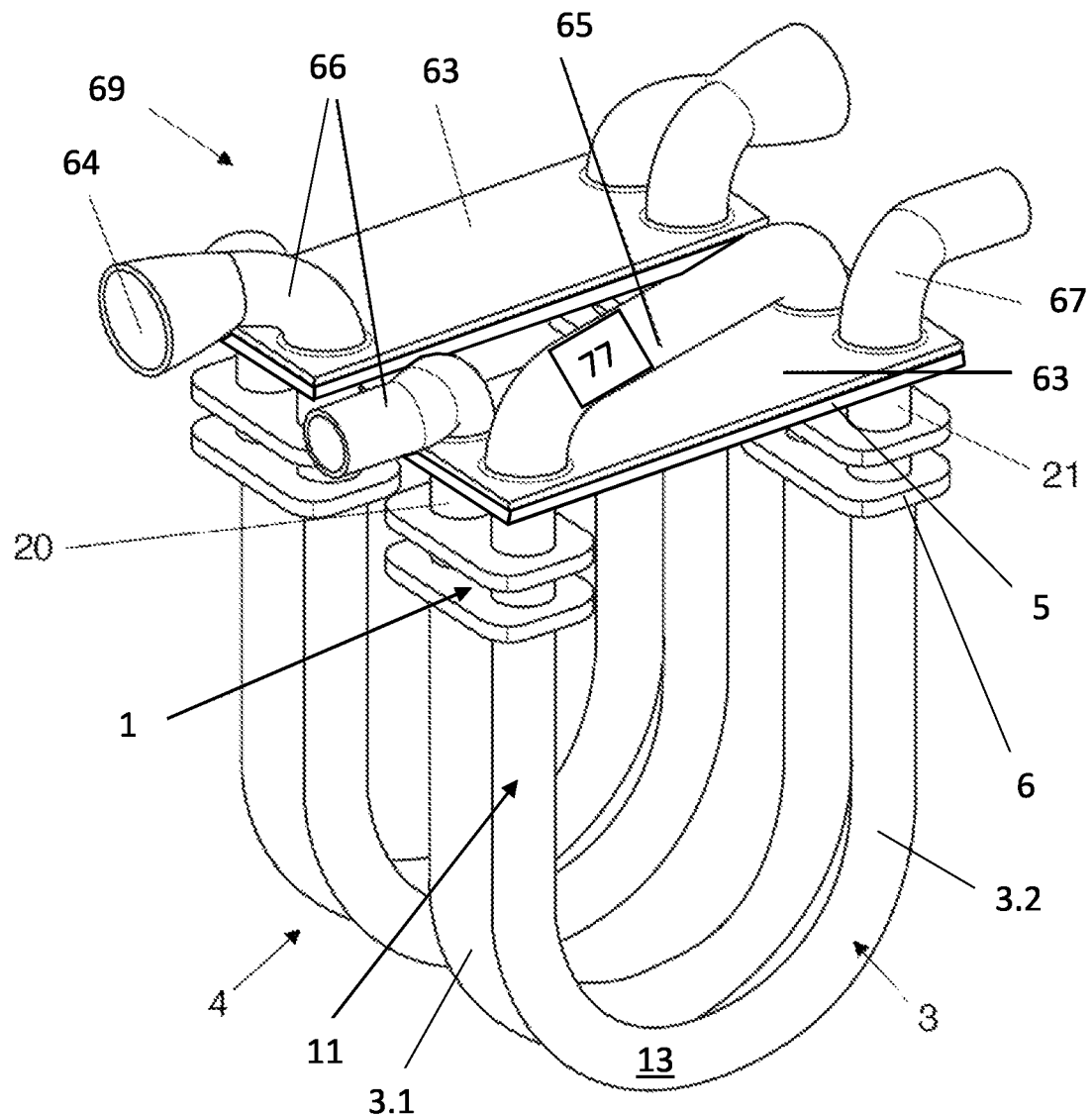
FIG. 1 shows a perspective view of two embodiments of the measuring transducer of the present disclosure.

FIG. 1 shows a perspective view of two embodiments of the measuring transducer 69. The first embodiment has a measuring tube arrangement 4 with an accompanying securement body arrangement 5. The measuring tube arrangement 4 includes exactly two measuring tubes 3.1, 3.2, which are mechanically coupled with one another via a coupler arrangement 1 comprising two coupling elements 6 in the inlet section 20 and two coupling elements 6 in the outlet section 21. The coupling elements 6 serve to form an oscillator composed of the two measuring tubes 3 individually excited to execute oscillations. In the shown embodiment, the coupling elements 6 are embodied plate shaped with rounded corners. However, other forms are known. The invention is not limited to any particular shape or numbers of coupling elements 6. For reasons of perspicuity, the oscillation exciter and the oscillation sensors, especially their individual components, are not shown. Between inlet section 20 and outlet section 21, the two measuring tubes 3.1, 3.2 have, in each case, two legs 11 and a bend connecting the two legs 11, such that the measuring tube bodies 13 are U-shaped. A securement body arrangement 5 is arranged on the ends of the measuring tubes 3.1, 3.2 and mechanically connects the two measuring tubes 3.1, 3.2 of the measuring tube arrangement 4 with one another. Mechanically connected with the securement body arrangement 5 is a connecting means 63, which includes pipe connection openings 64, to which in a connected state a hose- and/or plastic tube system is connected and which can be embodied as process connections. A large number of process connections are known, such as e.g. flanges, cutting ring fittings, screw-type hose couplings, connection taps, etc. The pipe connection openings 64 have, in each case, a passageway 66, 67. In the first embodiment, the inlet passageway 66 divides into two separate passageways, each of which is connected with a different inlet section 20 of the two measuring tubes 3. The same holds in reverse for the outlet passageway 67. The outlet passageway 67 receives from two passageways, each of which receives from the outlet section 21 of a different one of the two measuring tubes 3 and merges to form the outlet passageway 67 and one of the pipe connection openings 64. The nominal diameter of the pipe connection openings 64 and the nominal diameter of the measuring tubes 3 can differ. The flow direction of the medium conveyed through the pipe connection openings 64 differs from the flow direction of the medium in the inlet- and/or outlet sections 20, 21.

The second embodiment uses the same measuring tube arrangement 4 as the first embodiment and differs exclusively in the embodiment of the connecting means 63. The inlet passageway 66 is connected with the inlet section 20 of the first measuring tube 3.1. The outlet passageway 67 the connecting means 63 is connected with the outlet section 21 of the second measuring tube 3.2. A connecting passageway 65 connects the outlet section 21 of the first measuring tube 3.1 with the inlet section of the second measuring tube 3.2. The measuring tube arrangement 4 includes a mirror plane, which extends between the two measuring tubes 3.1, 3.2, in parallel with the longitudinal axes of the legs 11. The connecting passageway 65 includes a longitudinal axis, which is inclined relative to the mirror plane of the measuring tube arrangement 4.

Arranged on the exterior of the connection passageway 65 as near as possible to the conveyed medium is a temperature sensor 77, which can be, for example, a Pt100 or PT1000 element.

The connecting means 63 has a connecting means body, which comprises a plastic and preferably a polyether ether ketone (PEEK), polyaryletherketone (PAEK), polyphenylsulfone (PPSU), polyethersulfone (PESU), polysulfone (PSU), polyarylamide (PARA), polypropylene (PP), polycarbonate (PC), polyethylene (PE), fluoropolymer and/or HARD-polyethylene (HDPE).

Additionally, the measuring tube arrangement 4 includes a measuring tube arrangement body, which comprises steel and especially is formed of steel.

The connecting means 63 is connected via a fastener apparatus with the securement body arrangement 5 at least by shape interlocking. This is not shown in FIGS. 1 to 3. A detailed illustration of an embodiment is shown in FIGS. 4 and 5.

Figure 2:
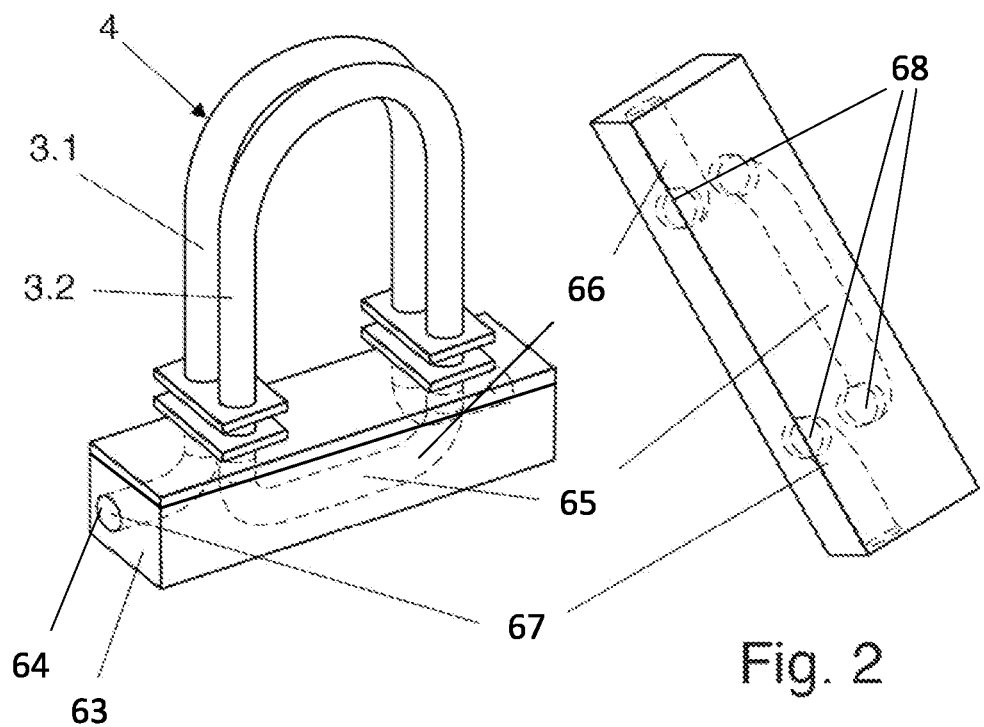
FIG. 2 shows two perspective views of another embodiment of the measuring transducer and the connecting means.

FIG. 2 shows two perspective views of another embodiment of the measuring transducer 69 of the invention, especially the connecting means 63. The measuring tube arrangement 4 is essentially identical to the embodiments of the measuring tube arrangement 4 shown in FIG. 1. Connecting means 63 is solidly and prismatically embodied. The inlet passageway 66 and the outlet passageway 67 are machined into the connecting means 63 and have, in each case, a bend, e.g. are embodied with L-shape. The inlet passageway 66 connects a measuring tube connection opening 68 with a pipe connection opening 64. Likewise the outlet passageway 67 connects a measuring tube connection opening 68 with a pipe connection opening 64. The inlet passageway 66 is connected with the inlet section 20 of the first measuring tube 3.1. The outlet passageway 67 is connected with the outlet section 21 of the first measuring tube 3.1. Connecting means 63 includes, additionally, a connecting passageway 65, which has a longitudinal axis, which lies in a plane shared with the longitudinal axes of the legs of the second measuring tube 3.2. The inlet section 20 of the second measuring tube 3.2 is connected via the connecting passageway 65 with the outlet section 21 of the second measuring tube 3.2. Thus, the medium is conveyed exclusively by the first measuring tube 3.1.

Figure 3:
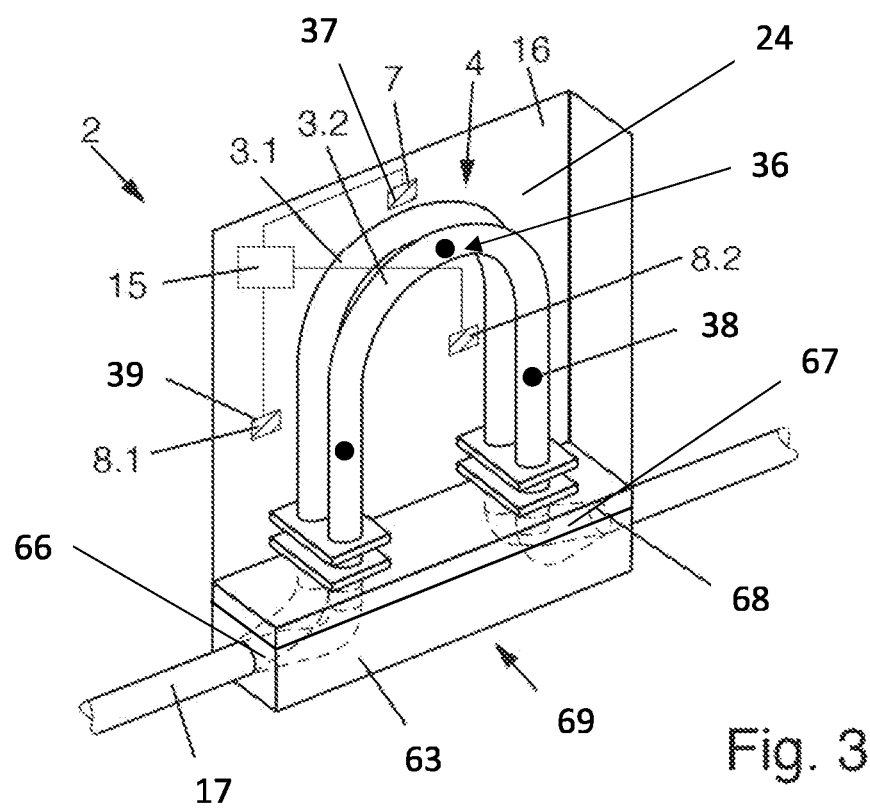
FIG. 3 shows a partially sectioned, perspective view of an embodiment of the measuring device.

FIG. 3 shows a partially sectioned, perspective view of an embodiment of the measuring device 2, comprising a measuring transducer 69 connected to a hose- and/or plastic tube system 17. As before, the measuring tube arrangement 4 of the measuring transducer 69 is the same as in the embodiments of FIGS. 1 and 2. Measuring transducer 69 is set in a support means 16, in which is also arranged the measuring- and/or operating circuit 15, which is connected with the oscillation exciter 7 and the two oscillation sensors 8.1, 8.2.

Connecting means 63 is prismatically embodied and includes an inlet passageway 66, which divides and extends into the inlet sections of the two measuring tubes 3.1, 3.2. The outlet passageway 67 extends from the outlet sections 21 of the measuring tubes 3.1, 3.2 to the pipe connection opening 68.

Arranged on the measuring tubes 3.1, 3.2, in each case, are one exciter magnet 36 and two sensor magnets 38, which are, respectively, components of the oscillation exciter 7 and the two oscillation sensors 8.1, 8.2. Oscillation exciter 7 includes an exciter coil 37. The two oscillation sensors 8.1, 8.2 include, in each case, a sensor coil 39. The coils 37, 39 are all arranged in the support means 16, or sunk into a wall of the support means 16. Arranged on the measuring tubes 3.1, 3.2 are the exciter magnets 36 and sensor magnets 38. The two measuring tubes 3.1, 3.2 have, in each case, a longitudinal plane, which is at the same time also a mirror plane. These mirror planes divide the measuring tubes 3.1, 3.2, in each case, into two sides. Arranged on the far sides of the two measuring tubes 3.1, 3.2 are, in each case, three magnets. One of the three magnets is an oscillation exciter component and two of the three magnets are oscillation sensor components.

The electronic measuring- and/or operating circuit 15 is adapted to ascertain and to make available the mass flow, the viscosity and/or the density, and/or the variable of a flowable medium derived therefrom. Additionally, the measuring- and/or operating circuit 15 is embodied to supply an operating signal to the oscillation exciter 7.

FIG. 4 shows a subsection of a longitudinal section of the measuring transducer 69 of the invention. Measuring transducer 69 includes a measuring tube arrangement 4 for conveying the flowable medium, a securement body arrangement 5 and a connecting means 63 for releasable connecting of the measuring tube arrangement 4 with a process line. Securement body arrangement 5 is connected with at least one measuring tube 3 in the inlet section 20 and/or outlet section 21 and includes at least one opening 70. Connecting means 63 includes measuring tube connection openings 68, to which the measuring tube arrangement 4 is connected. Additionally, the connecting means 63 is connected with the at least one measuring tube 3 in the inlet section 20 and/or in the outlet section 21. Connecting means 63 includes at least one fastener apparatus 71, which extends through the opening 70 of the securement body arrangement 5 and which is connected with the securement body arrangement 5 at least by shape interlocking. Securement body arrangement 5 has a first side 74 and a second side 75, wherein the first side 74 and the second side 75 face away from one another. The opening 70 extends from the first side 74 to the second side 75. Connecting means 63 includes a contact area 72 and the securement body arrangement 5 includes a contact area 73 on the first side 74, wherein the contact area 72 and the contact area 73 contact one another. The fastener apparatus 71 is embodied in such a manner that after the engaging of the fastener apparatus 71 the connecting means 63 effects via the fastener apparatus 71 a force on the securement body arrangement 5 with a force component in the direction of the second side 75.

The fastener apparatus 71 comprises a detent, which extends through the opening 70 and is engaged with the second side of the securement body arrangement 5. The fastener apparatus 71 is embodied in such a manner that when moving through the opening 70 it elastically deforms to a certain extent and then snaps back to form the shape interlocking connection.

Arranged between connecting means 63 and the second side 75 of the securement body arrangement 5 is an elastic seal 76—in the form of a sealing ring. Seal 76 is clamped between connecting means 63 and securement body arrangement 5 and the clamped state is maintained via the shape interlocking.

Connecting means 63 includes a measuring tube connection opening 68, which is embodied complementary to the inlet section 20 of a measuring tube. Furthermore, the connecting means 63 includes a measuring tube connection opening 68, which is embodied complementary to the outlet section 21 of a measuring tube. In the assembled state, the inlet section 20 and the outlet section 21 of the measuring tube 3 are arranged in the appropriate openings.

FIG. 5 shows an exploded view of an embodiment of the measuring transducer 69 of the invention. Measuring tube arrangement 4 includes, extending in parallel with one another, the two measuring tubes 3.1, 3.2, which have, in each case, in the inlet section 20 an inlet having an inlet direction and in the outlet section 21 an outlet having an outlet direction. Additionally, the two measuring tubes 3.1, 3.2 are, in each case, bent exactly once between inlet section 20 and outlet section 21. In this way, it results that the inlet direction and the outlet direction are directed oppositely. Securement body arrangement 5 is connected with the inlet sections 20 and the outlet sections 21 of the measuring tubes 3.1, 3.2. Connecting means 63 includes exactly two fastener apparatuses 71.1, 71.2 and the securement body arrangement 5 includes correspondingly exactly two openings 70.1, 70.2. The fastener apparatuses are embodied as detents. In an assembled state, the two fastener apparatuses 71.1, 71.2 extend through their openings 70.1, 70.2. In such case, the connecting means 63 effects via the two fastener apparatuses 71.1, 71.2, in each case, a force on the securement body arrangement 5 with a force component in the direction of the second side 75.

The invention claimed is:

1. A measuring transducer for a measuring device for registering mass flow, viscosity, density, and/or a variable derived therefrom, for a flowable medium, comprising:
   a measuring tube arrangement for conveying the flowable medium,
      wherein the measuring tube arrangement has at least one measuring tube,
      wherein the at least one measuring tube has an inlet section and an outlet section;
   at least a first exciter component of an oscillation exciter for exciting the at least one measuring tube to execute oscillations,
      wherein the first exciter component is arranged at the at least one measuring tube;
   at least a first sensor component of an oscillation sensor for registering oscillations of the at least one measuring tube,
      wherein the first sensor component is arranged at the at least one measuring tube;
   a securement body arrangement,
      wherein the securement body arrangement is connected with the at least one measuring tube in the inlet section and/or in the outlet section,
      wherein the securement body arrangement has at least one opening; and
   a connecting component for releasable connecting of the measuring tube arrangement with a process line,
      wherein the connecting component includes measuring tube connection openings, at which the measuring tube arrangement is connected, wherein the connecting component is connected with the at least one measuring tube in the inlet section and/or in the outlet section,
wherein the connecting component includes at least one fastener apparatus, which extends through the opening of the securement body arrangement,
wherein the connecting component is connected with the securement body arrangement via the fastener apparatus at least by shape interlocking.

2. The measuring transducer as claimed in claim 1,
wherein the securement body arrangement has a first side and a second side,
wherein the first side and the second side face away from one another,
wherein the opening extends from the first side to the second side,
wherein the connecting component has a contact area,
wherein the securement body arrangement has a contact area on the first side,
wherein the first contact area and the second contact area contact one another,
wherein the connecting component affects a force on the securement body arrangement via the fastener apparatus with a force component in the direction of the second side.

3. The measuring transducer as claimed in claim 1,
wherein the fastener apparatus comprises a detent.

4. The measuring transducer as claimed in claim 1,
wherein a seal is arranged between the connecting component and the second side of the securement body arrangement,
wherein the seal is clamped between the connecting component and the securement body arrangement and the clamping is retained via the shape interlocking.

5. The measuring transducer as claimed in claim 1,
wherein the connecting component has two fastener apparatuses,
wherein the securement body arrangement has two openings,
wherein each of the two fastener apparatuses extends through a different one of the two openings,
wherein the connecting component via the two fastener apparatuses effects forces on the securement body arrangement, each with a force component in the direction of the second side.

6. The measuring transducer of claim 1,
wherein the measuring tube arrangement has two measuring tubes, especially measuring tubes extending parallel to one another,
wherein the two measuring tubes have, in each case, in the inlet section an inlet having an inlet direction and in the outlet section an outlet having an outlet direction,
wherein the two measuring tubes are bent between inlet section and outlet section, in each case, at least once,
wherein the inlet direction and the outlet direction are oppositely directed,
wherein the securement body arrangement is connected with the inlet section and the outlet section of each measuring tube.

7. The measuring transducer as claimed in claim 6,
wherein the connecting component includes an inlet passageway,
wherein the inlet passageway is embodied to connect at least one inlet section of the measuring tubes with the process line,
wherein the connecting component includes an outlet passageway,
wherein the outlet passageway is embodied to connect at least one outlet section and preferably all the outlet sections of the measuring tubes with the process line.

8. The measuring transducer as claimed in claim 7,
wherein the connecting component includes a connecting passageway, which connects the inlet section of a first measuring tube with the outlet section of a second measuring tube.

9. The measuring transducer as claimed in claim 7,
wherein the connecting component includes a connecting passageway, which connects the inlet section of one of the two measuring tubes with the outlet section belonging to the measuring tub.

10. The measuring transducer as claimed in claim 7,
wherein the connecting component includes a first opening, which is complementary to the inlet section of one of the two measuring tubes,
wherein the connecting component includes a second opening, which is complementary to the outlet section of one of the two measuring tubes,
wherein the inlet section and the outlet section of one of the two measuring tubes are arranged in their complementary openings.

11. The measuring transducer as claimed in claim 1,
wherein the connecting component has a connecting component body,
wherein the connecting component body includes a plastic,
wherein the measuring tube arrangement has a measuring tube arrangement body,
wherein the measuring tube arrangement body comprises steel.

12. The measuring transducer as claimed in claim 1,
wherein the measuring tube arrangement comprises exactly two measuring tubes.

13. The measuring transducer as claimed in claim 1,
wherein the connecting component has a temperature sensor.

14. A measuring device for registering mass flow, viscosity, density, and/or a variable derived therefrom of a flowable medium, the measuring device comprising:
a support means;
a measuring transducer as claimed in claim 1;
at least a second exciter component of the oscillation exciter; and
at least a second sensor component of the oscillation sensor;
wherein the support means has a support means body with a seat,
wherein the measuring transducer is arranged in the seat and mechanically releasably connected with the support means body,
wherein the second exciter component is arranged on the support means body,
wherein the second sensor component is arranged on the support means body,
wherein the oscillation exciter includes an operating circuit, which is connected with at least one exciter component, especially the second exciter component of the oscillation exciter, and
wherein the oscillation sensor comprises a measuring circuit, which is electrically connected at least with one sensor component, especially the second sensor component of the oscillation sensor.

* * * * *